(12) United States Patent
Falkenborg

(10) Patent No.: US 8,984,937 B1
(45) Date of Patent: Mar. 24, 2015

(54) TIRE PRESSURE MONITORING SYSTEM WHEEL MOUNTING BRACKET

(71) Applicant: William C. Falkenborg, Tujunga, CA (US)

(72) Inventor: William C. Falkenborg, Tujunga, CA (US)

( * ) Notice: Subject to any disclaimer, the term of this patent is extended or adjusted under 35 U.S.C. 154(b) by 141 days.

(21) Appl. No.: 13/793,491

(22) Filed: Mar. 11, 2013

(51) Int. Cl.
*G01M 17/02* (2006.01)
*B60C 23/02* (2006.01)
*F16M 13/04* (2006.01)

(52) U.S. Cl.
CPC ..................................... *F16M 13/04* (2013.01)
USPC ............................. 73/146.8; 73/146; 340/442

(58) Field of Classification Search
None
See application file for complete search history.

(56) References Cited

U.S. PATENT DOCUMENTS

| | | | | |
|---|---|---|---|---|
| 3,938,076 | A * | 2/1976 | Hayashi | 340/448 |
| 4,807,468 | A * | 2/1989 | Galan | 73/146.5 |
| 4,953,395 | A * | 9/1990 | Jard | 73/146.8 |
| 6,340,929 | B1 * | 1/2002 | Katou et al. | 340/447 |
| 6,799,455 | B1 * | 10/2004 | Neefeldt et al. | 73/146 |
| 7,178,390 | B1 * | 2/2007 | Kalovsky et al. | 73/146 |
| 7,218,210 | B2 * | 5/2007 | Schoenberger et al. | 340/445 |
| 7,350,408 | B1 * | 4/2008 | Rogers et al. | 73/146 |
| 8,047,068 | B2 * | 11/2011 | Hamm et al. | 73/146.5 |
| 8,146,413 | B1 * | 4/2012 | Grace | 73/146.8 |
| 8,245,747 | B2 * | 8/2012 | Monjuvent et al. | 152/427 |
| 8,671,747 | B1 * | 3/2014 | Falkenborg | 73/146.8 |
| 2004/0263324 | A1 * | 12/2004 | Sanchez et al. | 340/442 |

* cited by examiner

*Primary Examiner* — Peter Macchiarolo
*Assistant Examiner* — Jermaine Jenkins
(74) *Attorney, Agent, or Firm* — Albert O. Cota

(57) ABSTRACT

A tire pressure monitoring system (TPMS) wheel mounting bracket that is designed to attach a TPMS to an air flow tube having means for being attached to a vehicle wheel rim. The TPMS wheel mounting bracket includes a first end that terminates with a vertical section having a threaded bore, and a second end that terminates with a tube/bracket attachment bore. When a threaded bolt is inserted through a bracket attachment bore located on the TPMS and into the threaded bore on the vertical section, the TPMS is secured to the first end of the TPMS wheel mounting bracket. The tube/bracket attachment bore located on the second end is dimensioned to fit over the air inlet tube that is secured to the TPMS mounting bracket by means of a bolt.

15 Claims, 6 Drawing Sheets

TIRE PRESSURE MONITORING SYSTEM WHEEL MOUNTING BRACKET

TECHNICAL FIELD

The invention generally pertains to mounting brackets, and more particularly to a mounting bracket that attaches a Tire Pressure Monitoring System (TPMS) to a tire inflation valve located on a rim of an aluminum or steel vehicle wheel.

BACKGROUND ART

Generally, whenever a person wants to determine the pressure contained within a vehicle tire a hand-held mechanical or digital gauge is utilized. The person would have to remove each tire's valve stem cap and manually place the gauge on the tire's valve stem. The gauge would then indicate the tire pressure which is either displayed on a calibrated metal rod/strip that extends outward from the gauge or on a digital readout.

As technology has improved vehicle manufacturers have developed automatic tire pressure monitoring systems (TPMS) which are now in use on many vehicles. The TPMS provides a driver of a vehicle with a visual indicator when a tire's pressure is too low or too high.

There are problems associated with a TPMS such as the difficulty of mounting the TPMS on certain types of vehicle wheels. As a result of the design of some wheels, such as special sized aluminum and steel truck wheels or duplex super single wheels, it is difficult to reliably and efficiently mount a TPMS.

What is needed is a mounting bracket that will provide the required attachment means for a TPMS on an aluminum or steel truck wheel or super single wheel. In the interest of economy, a single bracket or adapter that can be utilized for all three types of wheel would be optimal.

A search of the prior art did not disclose any literature or patents that read directly on the claims of the instant invention. However, the following U.S. patents are considered related:

| PAT. NO. | INVENTOR | ISSUED |
|---|---|---|
| 4,455,716 | Leonardo | Jun. 26, 1984 |
| 5,774,048 | Archterholt | Jun. 30, 1998 |
| 5,987,980 | Mangafas et al | Nov. 23, 1999 |
| 6,005,480 | Banzhof et al | Dec. 21, 1999 |
| 6,612,528 | Collins et al | Sep. 2, 2003 |
| 6,799,455 | Neefeldt et al | Oct. 5, 2004 |

U.S. Pat. No. 4,455,716 discloses a tap bracket or unitary cable clamp for connection to an overhead suspension cable of wire. The bracket comprises two edge panels integrally connected by a single bend, thus establishing an initially acute angle between the edge panels. Each panel has an elongated flange that is bent inward towards the opposite edge panel, thereby forming a space between the flanges.

U.S. Pat. No. 5,774,048 discloses a valve which generates a signal indicating a pressure drop in a vehicle tire. A pressure sensor and microprocessor are provided which store a value of the pressure in memory and compares pressure, sending a signal periodically.

U.S. Pat. No. 5,987,980 discloses a tire valve having a pressure sensor and transponder. The sensing device is removable from a valve stem. The device is electrically connected to a conductive portion of the valve element via a receptacle to facilitate an antenna system for radio frequency communication with the device.

U.S. Pat. No. 6,005,480 discloses a tire pressure radio-frequency sending unit mounted to a snap-in resilient valve body, with a column extending from the sending unit. The column defines a central passageway to facilitate insertion using standard insertion tools. In one version, two batteries are included in the sending unit that are disposed on opposite edges of the column.

U.S. Pat. No. 6,612,528 discloses a compound mounting bracket for attaching a solenoid to a structure. The bracket has a first and second plate each having a first edge and a second distal edge. The second edge of the first plate is connectable to a first mounting point on a solenoid. The second distal edge of the second plate extends in a direction generally transverse to the first edge of the second plate, thereby defining a dihedral angle between the first plate and the second plate.

U.S. Pat. No. 6,799,455 discloses a tire pressure monitor that continuously determines if a tire is adequately inflated for safe operation. The monitor includes an indicator that is utilized for each tire, indicating which tire is operational. The monitor includes a battery-operated pressure-sensitive radio frequency transmitter mounted on the outer end of a conventional tire valve stem and includes an antenna extending into each tire for transmitting a signal. The signal transmitted one each tire valve actuates the indicator associated with a single from only the transmitter assigned to each tire.

DISCLOSURE OF THE INVENTION

The tire pressure monitoring system (TPMS) wheel mounting bracket is designed to easily and securely attach a TPMS to a vehicle wheel rim. In its basic design the TPMS wheel mounting bracket has a first end from where is integrally formed a vertical section having means for being attached to the TPMS, and a second end having means for being attached to an air inlet tube, also referred to as a tire inflation valve. The air inlet tube includes a wheel rim attachment nut having an air passage bore from where air is applied to a tire mounted on the vehicle wheel rim.

The means for attaching the vertical section of the TPMS wheelmounting bracket to the TPMS comprises:

The TPMS having a bracket attachment bore,

The vertical section having a threaded TPMS/bracket attachment bore, and

A threaded bolt sequentially inserted into the TPMS bracket attachment bore and into the threaded TPMS/bracket attachment bore.

The means for attaching the second end of the TPMS mounting bracket comprises a tube/bracket attachment bore that is dimensioned to fit over the air inlet tube. When the air inlet tube is secured to the wheel rim by means of an air inlet securing nut, the second end of the TPMS wheel mounting bracket is secured to the air inlet tube.

In view of the above disclosure, the primary object of the invention is to produce a TPMS wheel mounting bracket that is easily and securely attached to a vehicle wheel rim.

In addition to the primary object of the invention, it is also an object of the invention to produce a TPM wheel mounting bracket that:

is easy formed of a single piece of material,
    can be formed of various materials,
    has an inherent structural integrity,
    can be easily attached or removed,
    requires no maintenance,
    can be sold as an OEM element or as an after-market addition, can be utilized with various types of TPMS,
can be attached to an aluminum or a steel wheel, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
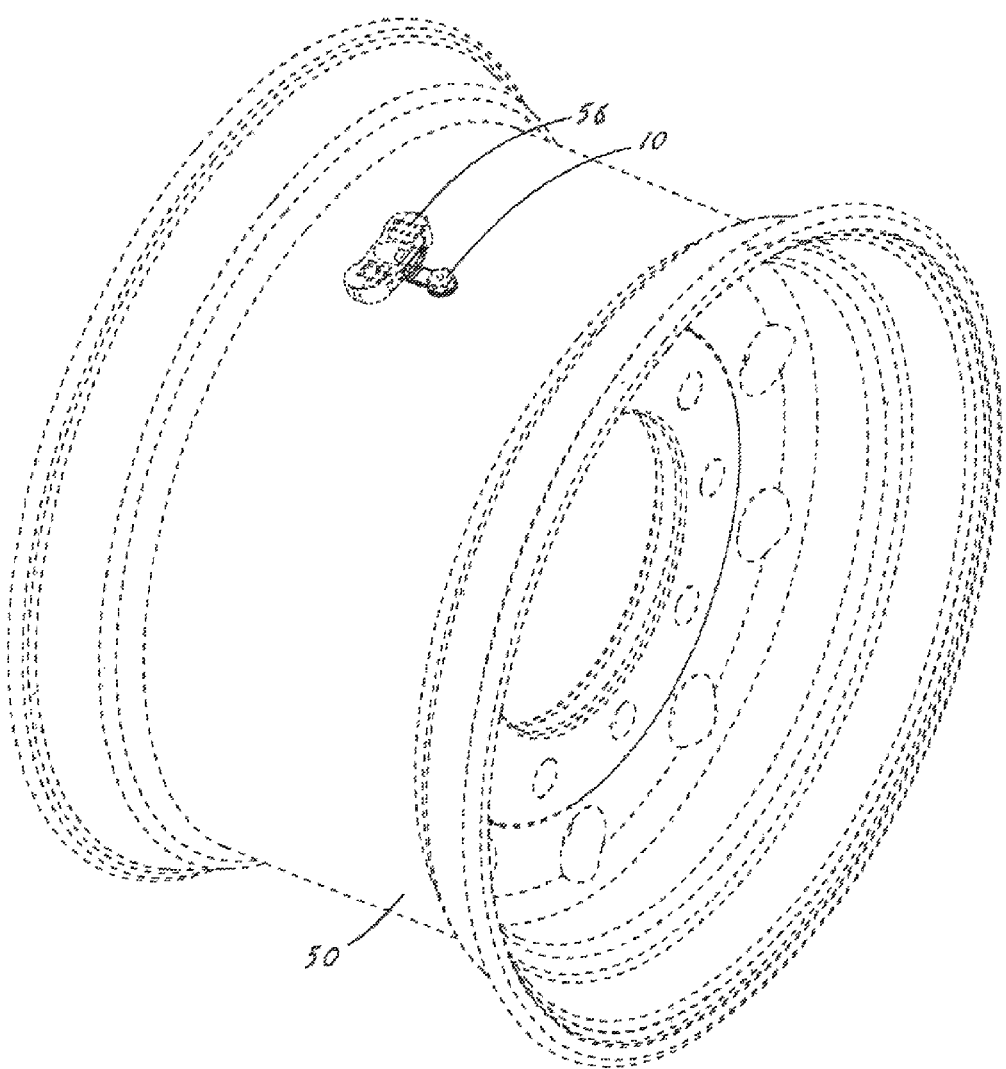
FIG. 1 is an orthographic view of a TPMS wheel mounting bracket extending from the outer surface of a vehicle wheel rim.
Figure 2:
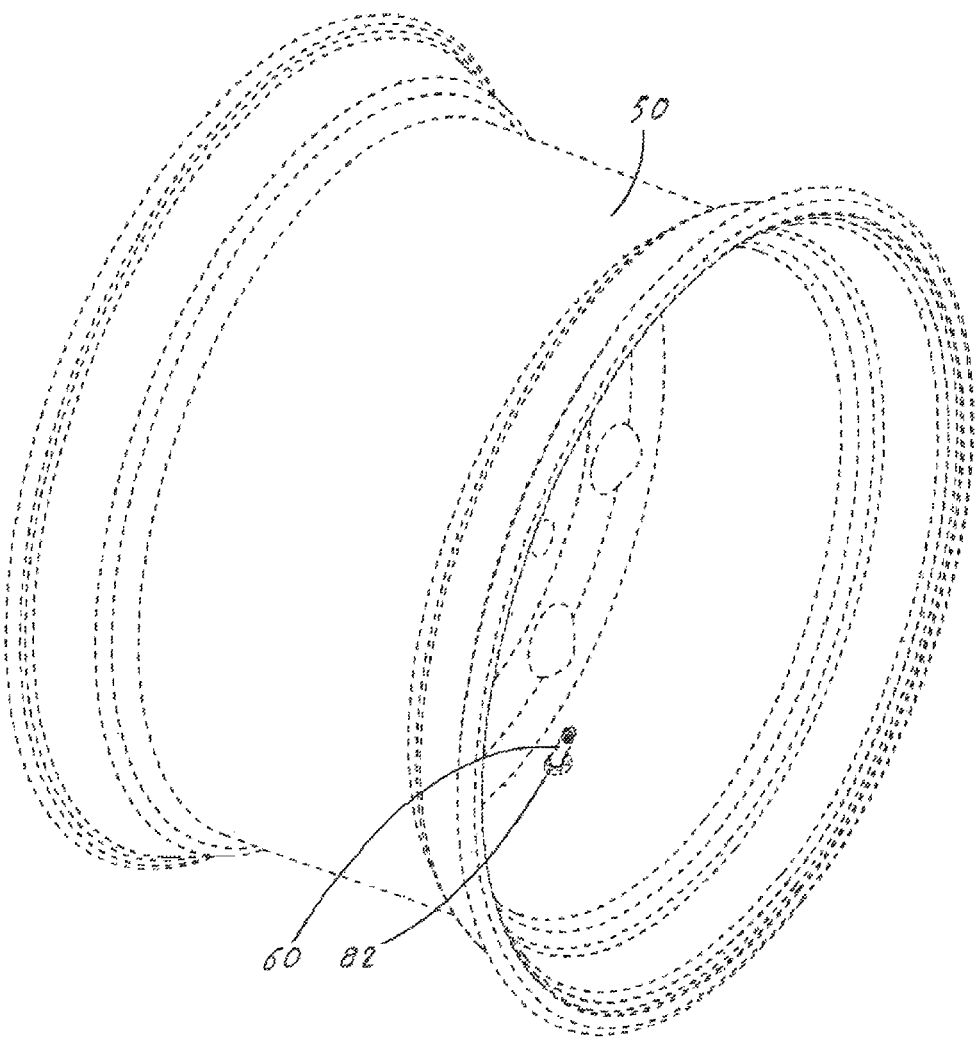
FIG. 2 is an orthographic view of the TPMS wheel mounting bracket extending from the inner surface of a vehicle wheel rim.

The best mode for carrying out the invention is presented in terms that disclose a preferred embodiment of a tire pressure monitoring system (TPMS) wheel monitoring bracket that is designed to attach a TPMS to the rim of a vehicle wheel. The preferred embodiment of the TPMS wheel mounting bracket 10, as shown in FIGS. 1-15, functions in combination with a vehicle wheel rim 50 that includes a tire-valve attachment cavity 52 having an air passage bore 54, a TPMS 56 having a bracket attachment bore 58, and an air inlet tube 60. The air inlet tube 60, as shown best in FIG. 3, has an upper end 62 and a lower end 64. To the upper end 62 is integrally attached a wheel rim attachment nut 66 which has a substantially centered air passage bore 68 that intersects with the air passage on the air inlet tube 60. The wheel rim attachment nut 66 has a hexagonal head that is dimensioned to fit into the tire-valve attachment cavity 52 located on the vehicle wheel rim 50. The TPMS wheel mounting bracket 10 is shown attached to the vehicle wheel rim 50 in FIGS. 1 and 2.

The air inlet tube 60 includes a set of upper tube threads 70 that extend downward from the upper end 62 of the tube 60, and a set of lower tube threads 72 that extend upward from the lower end 64 of the air inlet tube 60. The air inlet tube 60, preferably has an inward displacement and also utilizes an air check valve 74 that is inserted into the lower end 64 of the air inlet tube 60. Also attached to the air inlet tube 60 is a resilient upper washer 76 that interfaces with the lower surface of the wheel rim attachment nut 66, and a resilient lower washer 78. The resilient upper washer 76 can be imbedded into a groove on the nut or can be comprised of an O-ring. The lower washer 78 can be designed to include an inward circular protrusion 80, and an optional air inlet tube cap 84. To secure the TPMS wheel mounting bracket 10 an air-inlet tube securing nut 82 is attached to the set of upper tube threads 70, as shown best in FIGS. 4 and 5. The TPMS wheel mounting bracket 10 is shown attached to the TPMS 56 and to the air inlet tube 60 in FIGS. 4-7.

Figure 10:
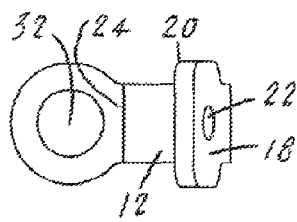
FIG. 10 is a top plan view of the TPMS wheel mounting bracket.
Figure 12:
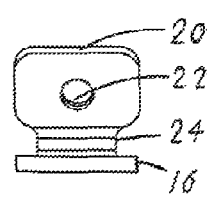
FIG. 12 is a rear elevational view of the TPMS wheel mounting bracket.
Figure 8:
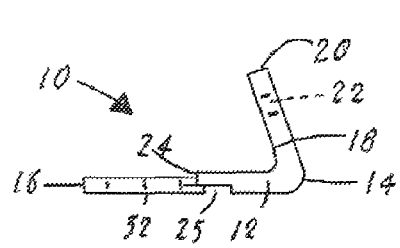
FIG. 8 is a side elevational view of the TPMS wheel mounting bracket.
Figure 11:
FIG. 11 is a front elevational view of the TPMS wheel mounting bracket.
Figure 9:
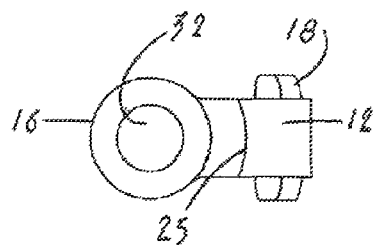
FIG. 9 is a bottom plan view of the TPMS wheel mounting bracket.

The TPMS mounting bracket 10 is the primary element that comprises the invention. The bracket 10 is integrally formed of a material selected from the group consisting of aluminum, steel, brass, copper and carbon fiber. If aluminum is used, it can be anodized to prevent oxidation and/or to produce the bracket 10 in a selectable color to identify a use for a particular wheel rim size. As shown in FIGS. 8-12, the bracket 10 is comprised of a horizontal section 12 having a first end 14, a second end 16, and a vertical section 18. The horizontal section includes a wheel rim recess 24 and a tube nut recess 25, as shown in FIGS. 8, 9 and 10.

The vertical section 18 integrally extends upward from the first end 14 of the horizontal section 12 and has an upper terminus 20, and is configured as a rectangle dimensioned to fit along the confines of the TPMS structure that has the bracket attachment bore 58. Located adjacent the upper terminus 20 is a threaded TPMS/bracket attachment bore 22 that accepts a threaded bolt 26. The bolt 26 is inserted via a washer 28 into the bracket attachment bore 58 and into the threaded TPMS/bracket attachment bore 22.

Figure 3:
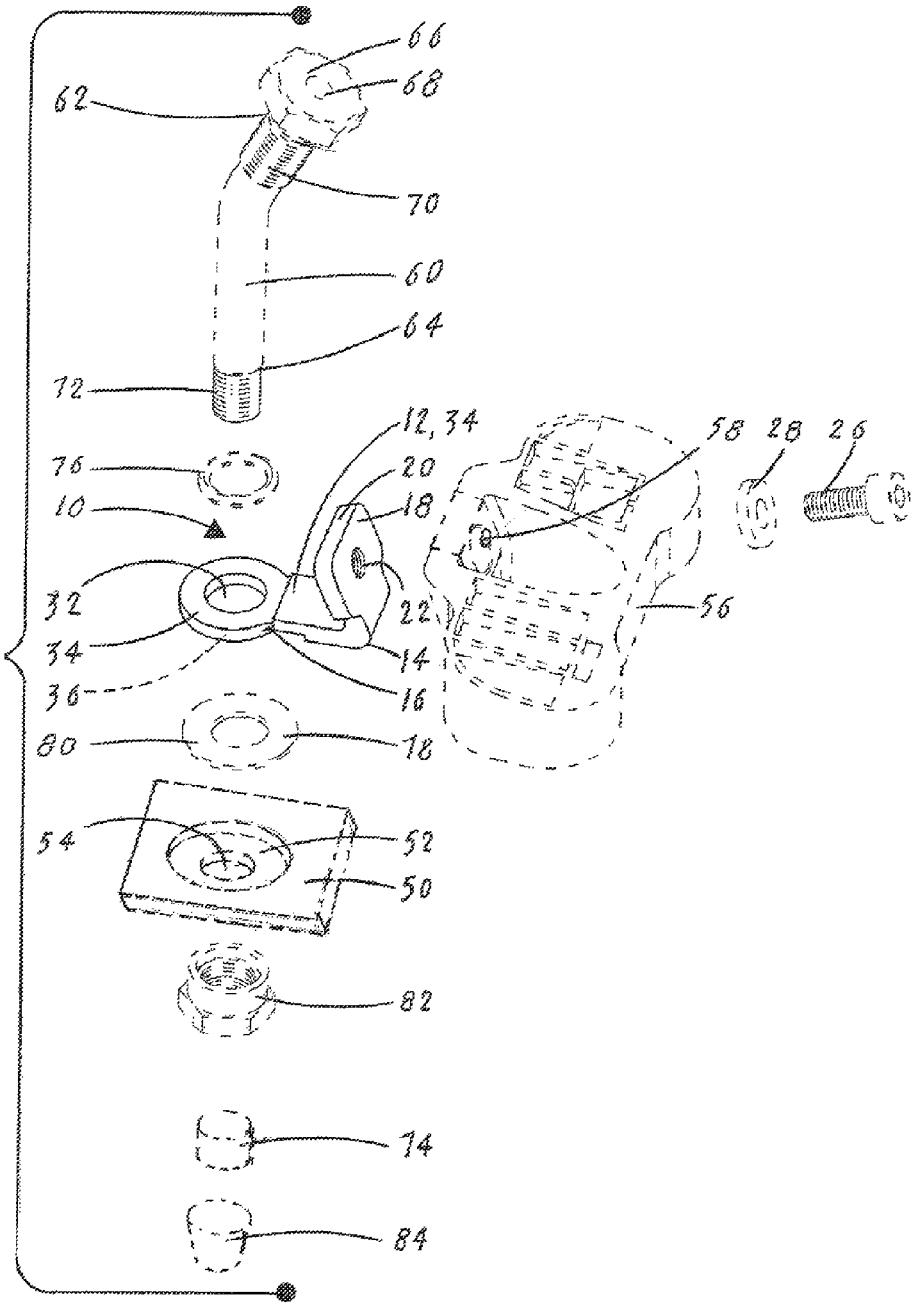
FIG. 3 is an exploded orthographic view of the TPMS wheel mounting bracket shown with the prior art elements that are used with the inventive bracket.
Figure 4:
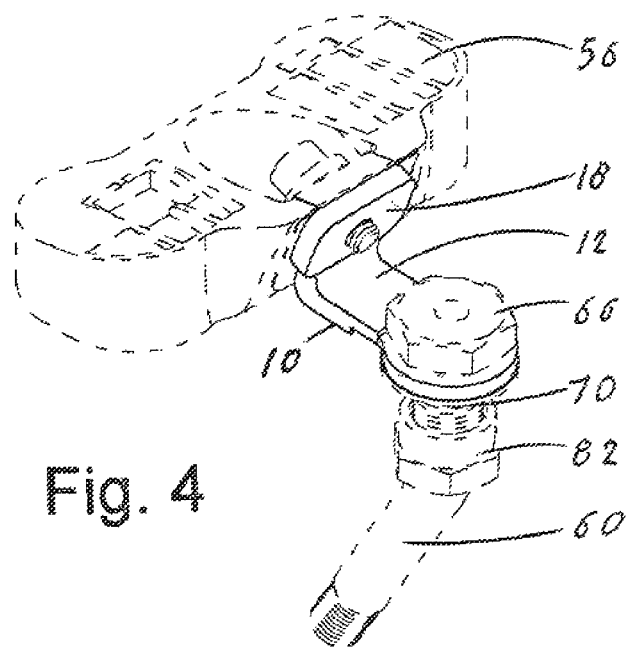
FIG. 4 is an upper side orthographic view of the TPMS wheel mounting bracket attached to the TPMS and to an air inlet tube.
Figure 5:
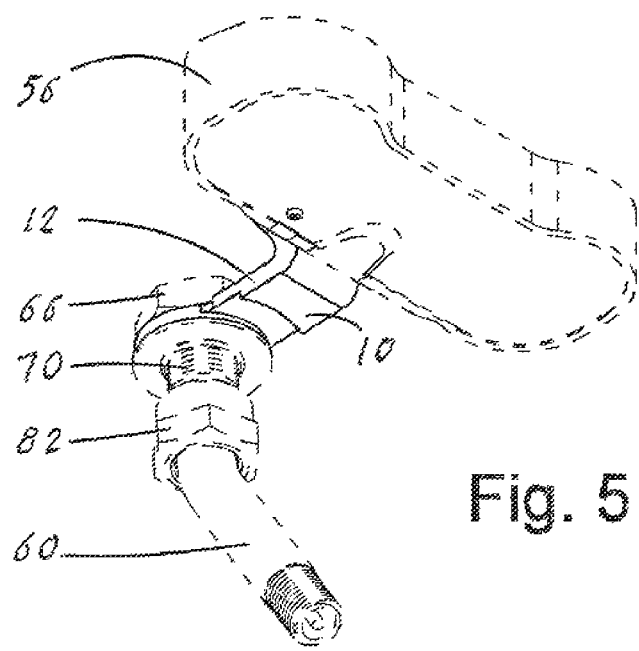
FIG. 5 is a lower side orthographic view of the TPMS wheel mounting bracket attached to the TPMS and to the air inlet tube.
Figure 6:
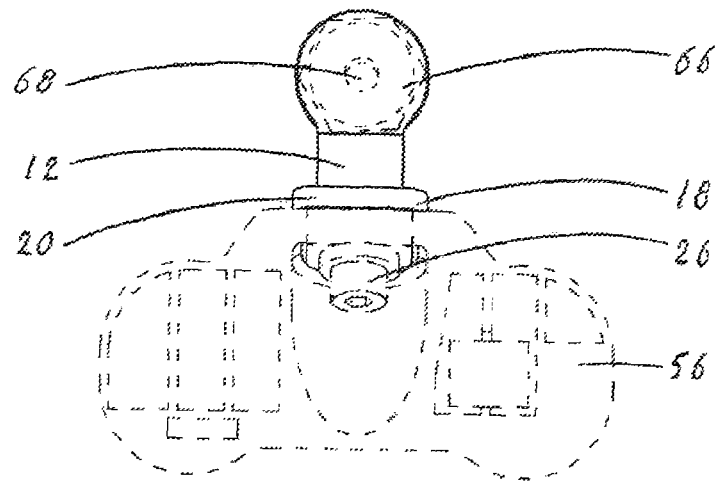
FIG. 6 is a top plan view of the TPMS wheel mounting bracket attached to the TPMS and to the air inlet tube.
Figure 7:
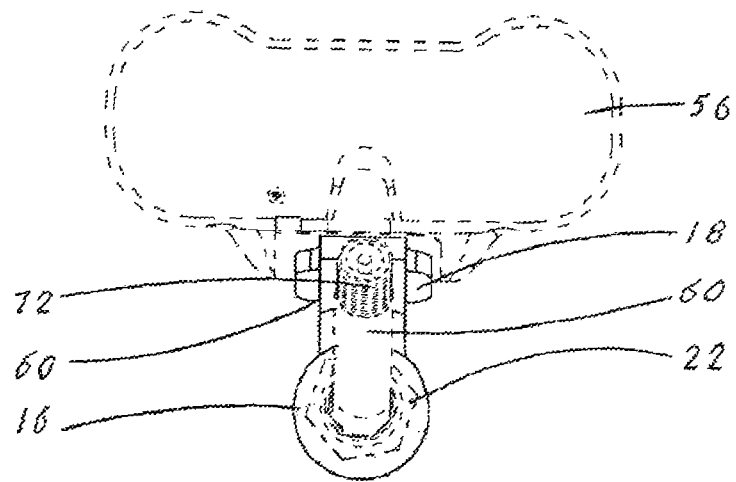
FIG. 7 is a bottom plan view of the TPMS wheel mounting bracket attached to the TPMS and to the air inlet tube.

Adjacent the second end 16 of the horizontal: section 12 is a tube/bracket attachment bore 32. The upper surface 34 of the bore 32 interfaces, via the resilient upper washer 76, with the lower surface of the wheel rim attachment nut 66. The lower surface 36 of the tube/bracket attachment bore 32 interfaces with the resilient lower washer 78. As shown in FIG. 3, the wheel mounting bracket 10 is located between the resilient upper washer 76 and the resilient lower washer 78. When the wheel rim attachment nut 66 and the air-inlet tube securing nut 82 are tightened, the TPMS wheel mounting bracket 10 is secured to the vehicle wheel rim 50.

Figure 13:
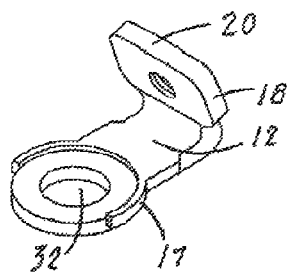
FIG. 13 is an orthographic top view of the TPMS wheel mounting bracket having laterally extended horizontal sides.
Figure 14:
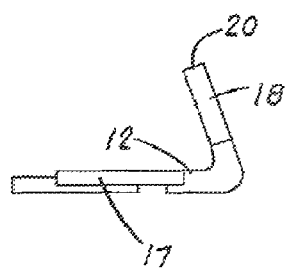
FIG. 14 is a side elevational view of the TPMS wheel mounting bracket having laterally extended horizontal sides.
Figure 15:
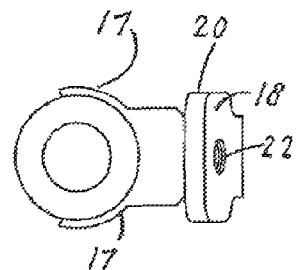
FIG. 15 is a top plan view of the TPMS wheel mounting bracket having laterally extended horizontal sides.

To enhance the structural integrity of the TPMS mounting bracket 10, the sides of the brackets horizontal section 12, as shown in FIGS. 13-15, are laterally extended.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A tire pressure monitoring system (TPMS) wheel mounting bracket that functions in combination with a vehicle wheel rim that includes a tire-valve attachment cavity having an air passage bore, a TPMS having a bracket attachment bore, and an air inlet tube having an upper end and a lower end, wherein to the upper end is integrally attached a wheel rim attachment nut having an air-outlet bore that intersects the air-inlet tube and that is dimensioned to fit into the tire-valve attachment cavity, a set of upper tube threads that extend from the upper end of the air inlet tube, and a set of lower tube threads that extend from the lower end of the air inlet tube, an air-check valve that is inserted into the lower end of the air inlet tube, a resilient upper washer that interfaces with the lower surface of the wheel rim attachment nut, a resilient lower washer, and an air-inlet tube securing nut, wherein said TPMS wheel mounting bracket comprises:

a) a horizontal section having a first end, a second end, a wheel rim recess and a tube nut recess, b) a vertical section that integrally extends upward from the first end of the horizontal section and having an upper terminus, a threaded TPMS/bracket attachment bore that accepts a threaded bolt that is inserted via a washer into the TPMS bracket attachment bore and threaded into the threaded TPMS/bracket attachment bore, and c) a tube/bracket attachment bore located adjacent the second end of the horizontal section wherein the upper surface of the tube/bracket attachment bore interfaces via the resilient upper washer with the lower surface of the wheel rim attachment nut and the lower surface of the tube/bracket attachment bore interfaces with the resilient lower washer, wherein said wheel mounting bracket is located between the resilient upper washer and the resilient lower washer, wherein when the wheel rim attachment nut and the air-inlet tube securing nut are tightened, said TPMS wheel mounting bracket is secured to the vehicle wheel rim.

2. The TPMS wheel mounting bracket as specified in claim 1 wherein the horizontal section of said bracket further comprises on the upper surface a wheel rim recess.

3. The TPMS wheel mounting bracket as specified in claim 2 wherein the horizontal section of said bracket further comprise an its lower surface a tube nut recess.

4. The TPMS wheel mounting bracket as specified in claim 1 wherein the lower resilient washer further has a downward extending protrusion.

5. The TPMS wheel mounting bracket as specified in claim 1 wherein the wheel rim attachment nut and the air-inlet tube securing nut have a hexagonal head.

6. The TPMS wheel mounting bracket as specified in claim 1 wherein the air inlet tube has an inward displacement.

7. The TPMS wheel mounting bracket as specified in claim 1 wherein said TPMS wheel mounting bracket is made of a material that is selected from the group consisting of aluminum, steel, brass, copper and carbon fiber.

8. The TPMS wheel mounting bracket as specified in claim 7 wherein the aluminum bracket is anodized to prevent oxidation.

9. The TPMS wheel mounting bracket as specified in claim 1 wherein the vertical section is configured as a rectangle dimensioned to fit along the confines of the TPMS structure having the bracket attachment bore.

10. The TPMS wheel mounting bracket as specified in claim 9 wherein the second end of the horizontal section that encompasses the tube/bracket attachment bore has a circular shape.

11. The TPMS wheel mounting bracket as specified in claim 10 wherein the circular section is recessed.

12. The TPMS wheel mounting bracket as specified in claim 1 wherein the vertical section is displaced inward to correspond to the angled surface of the TPMS.

13. The TPMS wheel mounting bracket as specified in claim 1 further comprising an air check valve that is inserted into the lower end of the air inlet tube.

14. The TPMS wheel mounting bracket as specified in claim 1 further comprising an air inlet tube cap that is attached to the lower tube threads on the air inlet tube.

15. The TPMS wheel mounting bracket as specified in claim 1 wherein the sides of said brackets horizontal section are laterally extended to enhance the structural integrity of said TPMS mounting bracket.

\* \* \* \* \*